United States Patent [19]

Strubin

[11] 4,307,449

[45] Dec. 22, 1981

[54] ELECTRONIC TIME-COUNTER FOR THE DIVING

[75] Inventor: Daniel Strubin, Chatelaine, Switzerland

[73] Assignee: Montres Rolex S.A., Geneva, Switzerland

[21] Appl. No.: 45,742

[22] Filed: Jun. 5, 1979

[30] Foreign Application Priority Data

Jun. 9, 1978 [CH] Switzerland ........................ 6305/78

[51] Int. Cl.[3] ........................ G07C 1/10; G06F 15/42

[52] U.S. Cl. ........................ 364/418; 73/291; 73/432 R; 235/92 MT; 235/92 T

[58] Field of Search .................. 364/418; 235/92 MT, 235/92 T, 92 GA; 73/291, 300, 432 R, 427, 712, 170 R, 170 A; 340/661-663, 620

[56] References Cited

U.S. PATENT DOCUMENTS

| | | | |
|---|---|---|---|
| 3,911,360 | 10/1975 | Kimzey | 340/661 |
| 3,942,167 | 3/1976 | McClintock | 340/620 |
| 3,969,635 | 7/1976 | Wilke | 340/662 |
| 3,978,463 | 8/1976 | Kerscher | 340/620 |
| 3,992,948 | 11/1976 | D'Antonio et al. | 73/432 R |
| 4,005,282 | 1/1977 | Jennings | 364/418 |
| 4,054,783 | 10/1977 | Seireg et al. | 364/418 |
| 4,107,995 | 8/1978 | Ligman et al. | 364/418 |
| 4,109,140 | 8/1978 | Etra | 235/92 MT |
| 4,192,001 | 3/1980 | Villa | 364/418 |

*Primary Examiner*—Charles E. Atkinson
*Assistant Examiner*—Gary Chin
*Attorney, Agent, or Firm*—Silverman, Cass & Singer, Ltd.

[57] ABSTRACT

An electronic time-counter for diving including a device ensuring its automatic switching on under the action of the water during its immersion and a unique control element manually operable and arranged in such a way that its operation produces the reset to zero of the display device so as enable the diver to measure the intermediary time durations between the beginning and the end of a dive. This counter includes moreover a first memory circuit recording the time which has elapsed between the automatic switching on of the counter at the moment of its immersion and the first operation of the control element. This counter further includes second memory circuit recording the total duration of the dive between the automatic switching on of the counter at the moment of its immersion and its automatic releasing or switching off at the moment of its emersion.

8 Claims, 4 Drawing Figures

ELECTRONIC TIME-COUNTER FOR THE DIVING

BACKGROUND OF THE INVENTION

The present invention relates to an electronic time counter, which may be carried, for the diving.

The purpose of the invention is to furnish to divers an apparatus which is presently missing. Such an apparatus would provide for easy checking of the duration of the decompression levels the divers have to respect during their upward motion. Such an apparatus further would furnish a checking means, especially useful in the case of a diving incident or accident, providing the indication of, while the apparatus is emerged, the time which has lapsed between the beginning of the dive and the moment when the diver has decided to undertake his upward motion.

SUMMARY OF THE INVENTION

An electronic time counter for diving which is carried by a diver during the dive. The electronic time counter includes a source of electric energy, a time base and divider means coupled to provide a pulsed time unit signal, counter means for counting the pulses of the time unit signal, and display means for visually displaying the count in the counter means. The counter means are switchable between an enabled condition in which the counter means count the pulses and a disabled condition in which the counter means perform no counting of the pulses. The counter means further include at least a portion which is resetable to zero.

The electronic time counter further includes pickup means for automatically placing and maintaining the counter means in the enabled condition under the action of water at the immergence of the time counter and for automatically placing and maintaining the counter means in the disabled condition under the absence of water at the emergence of the counter. Control means further are provided which are manually operable to reset to zero the counter means to provide for the measurement of intermediate time periods between the immergence and emergence of a dive.

BRIEF DESCRIPTION OF THE DRAWING

The drawing shows, by way of example, one embodiment of the invention and a modification.

DESCRIPTION OF THE PREFERRED EMBODIMENT

Figure 1:
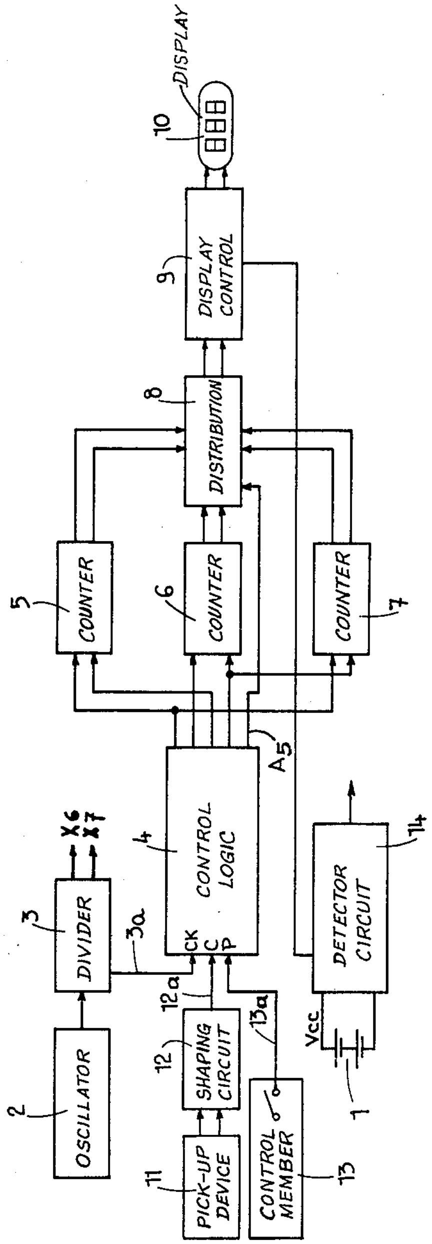
FIG. 1 is a block diagram of the principle of an electronic minutes counter for diving.
Figure 2:
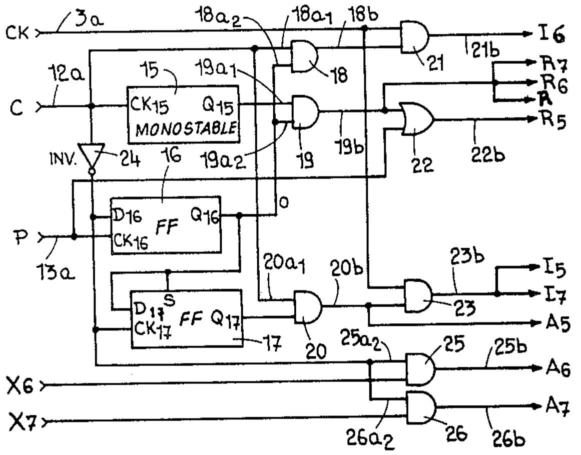
FIG. 2 shows a logic control circuit of this counter.
Figure 3:
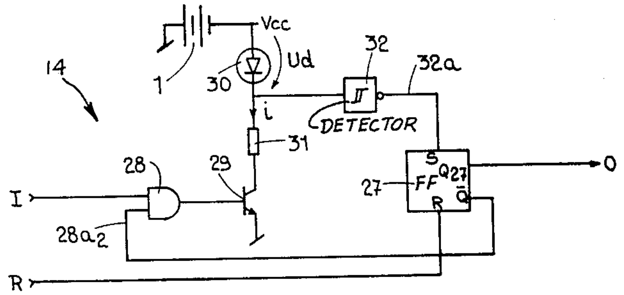
FIG. 3 shows an energy source detector circuit in greater detail.

The minutes counter represented in FIGS. 1 to 3 comprises a source of energy constituted by an electric battery 1 or by a rechargeable accumulator, a time base providing a time base signal constituted by an oscillator 2, for instance a quartz oscillator, a division chain or divider 3 providing a time unit signal from the time base signal, a logic control circuit 4, three counters 5, 6 and 7, a distribution circuit 8, a display control circuit 9, which provides decoding and multiplexing, and a display device 10 having three electroluminescent diode digits being able to count up to 999 minutes. The apparatus moreover comprises a pick-up device 11, which may be an immersion sensor as known in U.S. Pat. Nos. 3,978,463 and 3,942,167, the signals of which are sent to the logic circuit 4 while passing through a shaping circuit 12, and a manually operable control member, for instance a push button switch, designated by 13. At last the apparatus comprises a detecting circuit 14 of the state of the source of energy 1.

Other elements of the apparatus will be mentioned as the specification of its operation proceeds.

Apparatus at rest

When the apparatus is at rest, the pick-up device 11, or more precisely the output **12*a* of the shaping circuit 12, it at the logic state 0, as is the line 13*a* coming from the control member. Consequently, there is no signal at the inputs C and P respectively connected to lines 12*a* and 13*a* of the control logic 4 represented in detail in FIG. 2. This control logic 4 comprises a monostable circuit 15 and two bistable flip-flops 16 and 17. If the three outputs $Q_{15}$, $Q_{16}$, and $Q_{17}$ of 15, 16 and 17, which are connected to AND gates 18, 19 and 20, are at the logic state 0, hence all the outputs of the control logic 4** are also at the logic state 0.

Pressure on the push button switch, the apparatus being non immerged

If a first pressure is exerted on the push button switch 13 while of apparatus is outside the water or non-immerged in water, the output **12*a* of the shaping circuit 12 remains at the logic state 0 so that the output $Q_{15}$ of the monostable 15 also remains at the logic state 0. On the other hand, the line 13*a* provides a logic signal 1 so that the flip-flop 16 is operated, the input $D_{16}$ being also at the logic state 1, owing to an inverter 24, and output $Q_{16}$ consequently passes to the logic state 1, thus switching on the flip-flop 17**, the output $Q_{17}$ of which passes also to the logic state 1.

It results from what preceeds that the output **18*b* of the AND gate 18 remains at the logic state 0 since one of its inputs, i.e., 18*a*$_1$, connected to output 12*a*, has remained at the logic state 0. The output of the AND gate 18 being at the logic state 0, the output 21*b* of an AND gate 21, to which is connected the output of the AND gate 18, also is at the logic state 0. The output 19*b* of the AND gate 19 remains at the logic state 0 since the output $Q_{15}$ of the monostable 15 has remained at the logic state 0. Consequently, the reset to zero outputs $R_6$ and $R_7$ of the control logic 4, connected to the output 19*b* of the AND gate 19, are at the logic state 0. The output 13*a* of the push button switch 13 is directly connected to an OR gate 22 and having passed to the logic state 1 causes the output 22*b* of this OR gate 22 to pass to the logic state 1. The output 20*b* of the AND gate 20 remains at the logic state 0 since its input 20*al,* connected to output 12*a*, is at the logic state 0. This is the same state for the output 23*b* of an AND gate 23 to which is connected the output 20*b* of the AND gate 20. Hence the two inputs I5 and I7 of the control logic 4, connected to the output 23*b* of the AND gate 23**, are at the logic state 0.

Consequently, and in this state of the circuit, the pulses coming from the divider 3, through the output **3*a* of this latter, arriving at the input CK of the control logic 4, are without any effect. This means that a pressure exerted on the control push button switch 13** or an actuation thereof when apparatus is outside the water is without effect, at least concerning measuring per se.

Other effects of such a pressure or actuation will be indicated later herein.

Immersion of the apparatus

If the apparatus then is immersed, the pick-up device 11 produces, under the effect of the surrounding water, an analog signal the shaping circuit 12 transforms into a logic signal 1 which is applied by the line 12*a* to the input C of the control logic 4. A short pulse then appears at the output $Q_{15}$ of the monostable 15, which is directed onto the input 19*$a_1$* of the AND gate 19. As its second input, 19*$a_2$*, is also at the logic state 1, one finds again this pulse at the reset to zero outputs $R_5$, $R_6$ and $R_7$, of the control logic 4, with the OR gate 22 providing the output $R_5$. This pulse is provided in the apparatus in such a way as to reset to zero the three counters 5, 6 and 7. Since this pulse is short, the output $Q_{15}$ of the monostable 15 immediately comes back to the logic state 0. The signal coming from the shaping circuit 12, through the output 12*a* of this latter, is also sent to the input 18*$a_1$*, of the AND gate 18 and to the input 20*$a_1$* of the AND gate 20. Hence, the output 18*b* of the AND gate 18 passes to the logic state 1, which then provides for the passage of the pulses of the divider 3, coming through the line 3*a*, to the input CK of the control logic 4, which pass through the AND gate 21 and reach the output I6, wherefrom they increment the counter 6. The output 20*b* of the AND gate 20 also passes to the logic state 1, which provides for the passage of the pulses coming from the divider 3 through the AND gate 23 in the direction of the outputs $I_5$ and $I_7$ of the control logic 4, wherefrom they increment the two counters 5 and 7. The three counters are thus incremented, that means that they start to count from the moment when the apparatus is immersed in water, without the diver having to effect any operation, especially by means of the control push button switch 13.

It is to be noted that what is then displayed by the display device 10 is the content of the counter 5. This occurs in response to the display output $A_5$ of the logic control 4, connected to the output 20*b* of the AND gate 20 passing to the logic state 1, and which further is connected to one of the inputs of the distribution circuit 8 for acting thereon so as to provide for the content of the counter 5 to pass to the control circuit 9 of the display 10.

It may be useful here to mention what would happen in the case where the diver would emerge from the water anew without having, during the dive, operated the control pusher 13: The pick-up 11 or more precisely the output 12*a* of the shaping circuit 12 would come back to the logic state 0. It would therefrom result that a short pulse would appear at the output $Q_{15}$ of the monostable 15. This pulse would then pass through the AND gate 19 and would directly go to the reset to zero outputs $R_6$ and $R_7$ as well as, through the OR gate 22, to the reset to zero output $R_5$. Thus, the three counters would be reset to zero so that the apparatus would not record the duration of untimed immersions or dives during which the diver had not operated the push button switch 13.

It is to be noted that, during emersions which would follow such untimed immersions, the pulses coming from the divider 3 by the line 3*a* on the input CK of the control logic 4 would no longer pass through the AND gates 21 and 23, since the input C of the logic 4 would be at the logic state 0, so that the counters 5, 6 and 7 would then not be incremented.

Operation of the control push button switch during the immersion

If, during the immersion, the diver operates the push button switch 13, which he will do when he is ready to undertake his upward motion, the output $Q_{16}$ of the flip-flop 16 passes to the logic state 0 since one of the inputs of this flip-flop, i.e. the input $CK_{16}$, connected to the line 13*a* coming from the push button switch 13, has passed to the logic state 1, and since its input $D_{16}$ is at the logic state 0, owing to the inverter 24. The input 18*$a_2$* of the AND gate 18 thus passes to the logic state 0, and the output 18*b* of AND gate 18 passes to the logic state 0, locking or disabling the AND gate 21. Hence the CK pulses, coming from the divider 3 no longer reach the counter 6 and counter 6 ceases to be incremented. Counter 6 serves as a memory and will indicate later, if necessary, for instance in case of an accident, the time which has lapsed during the dive up to the moment of the beginning of the upward motion.

Moreover, the output $R_5$ of the control logic 4 receives the pulse produced by the operation of the push button switch 13 through the OR gate 22, which resets to zero the counter 5 which continues to be displayed.

Successive operations of the control push button switch during the immersion

It is to be noted that successive ulterior operations of the push button switch 13 do not change the state of the flip-flop 16. As a matter of fact, its input $D_{16}$ steadily remains at the logic state 0 so long the apparatus is immersed. Consequently, such successive operations of the pusher 13, when the apparatus is immersed, have only for an effect, each, to reset the counter 5 to zero, which is displayed. Thus during his upward motion the diver can check the duration of the decompression levels, by acting on the push button switch 13 at the beginning of each of them.

Emersion

During the final emersion, the pick-up 11, under the effect of the absence of surrounding water, passes to the logic state 0, more exactly the output 12*a* of the shaping circuit 12 passes to the logic state 0. Hence, the input $CK_{17}$ of the flip-flop 17 passes to the logic state 1 owing to the presence of the inverter 24. The input $D_{17}$ of this flip-flop being at the logic state 0, the output $Q_{17}$ of this flip-flop, up to now at the logic state 1, passes to the logic state 0. This has the effect that the AND gates 20 and 23 are locked or disabled, preventing the pulses which are on lead CK and coming from the divider 3 to pass to the outputs $I_5$ and $I_7$ of the control logic 4. Hence, the two counters 5 and 7 cease to be incremented, as well as the counter 6, which was not incremented for a long time, i.e. since the first pressure was effected under the water on the push button switch 13. It is to be noted that there is no reset to zero at this time. As a matter of fact, there is a short pulse at the output $Q_{15}$ of the monostable 15 due to the changes of the state of the input $CK_{15}$ of this monostable (change of state of the output 12*a* of the shaping circuit 12) but this pulse is without effect on the AND gate 19 since the other input 19*$a_2$* is at the logic state 0. Consequently, there is no change either of the OR gate 22, and consequently of the output $R_5$ of the control logic 4, or of the outputs $R_6$ and $R_7$.

The display completely ceases since the output $A_5$, connected to the output 20_b_ of the AND gate 20, passes to the logic state 0.

Untimed re-immersion

What would happen in the case of a re-immersion without a pressure being exerted on the pusher 13 during the emersion? The output 12_a_ of the shaping circuit 12 passes again to the logic state 1, but the whole circuit remains locked, the outputs of the flip-flops 16 and 17 remaining at the logic state 0.

If, during such an untimed immersion, a pressure is exerted on the push button switch 13, the outputs of the two flip-flops 16 and 17 remain however at the logic state 0, the signal coming from the push button switch 13, by the line 13_a_, being without effect.

At the emersion, after such an intermediary immersion, the line 12_a_ passes again to the logic state 0, that is without effect.

Thus, one can see that, after the first emersion, successive immersions and emersions, even with pressure on or actuations of the push button switch 13 during the intermediary immersions, are without effect.

Operations of the pusher, the apparatus being emerged

When a pressure is exerted on the switch 13, the apparatus being outside the water, a "switching on" signal is sent to the divider 3 by a circuit not represented in the drawing. In response thereto the divider 3 sends successive pulses to its outputs X6 and X7 (FIG. 2), of two seconds duration each, to two AND gates 25 and 26 the outputs 25_b_ and 26_b_ of which are connected to display outputs $A_6$ and $A_7$, respectively, of the control logic 4. Since the apparatus is outside or out of the water, the two other inputs 25_a_ and 26$a_2$ of these two AND gates 25 and 26 are at the logic state 1, being connected by the intermediary of the inverter 24 to the output 12_a_ of the shaping circuit 12, which is at the logic state 0. Consequently, the two AND gates 25 and 26 successively send a logic signal 1 on the outputs $A_6$ and $A_7$ connected to the directing circuit 8, which produces the successive display of the content of the two counters 6 and 7. Consequently, the diver can know successively (1) the duration of his dive up to the first pressure he has effected on the switch 13 at the moment when he decided to go upward, and (2) the total duration of the dive.

If the diver does not exert a new pressure on the switch 13, the dividing circuit 3 does not send pulses X6 and X7 to the AND gates 25 and 26. Consequently, there is no more display. On the other hand, any new pressure exerted on the switch 13 produces the repetition of the operations as mentioned hereabove, that is to say a new successive display of the content of the counters 6 and 7 for a period of two seconds each.

The circuit 14, represented in detail in FIG. 3, is intended to advise the user he has to change his battery or to recharge the accumulator by reason of its exhaustion. This circuit is arranged in such a way as to measure the internal resistance of the source of energy, this internal resistance increasing as a function of the capacity used, at least for some types of batteries or accumulators.

The battery 1 is connected between the ground of the apparatus and a terminal Vcc of the circuit 14. This circuit 14 comprises a flip-flop 27 which is assumed at the starting point to be at rest with its output Q being at the logic state 1. The pulses on the terminal I of the circuit 14 coming from the divider 3, consequently pass through an AND gate 28 which is not disabled, and reach a transistor 29 which provides for at each pulse, the passage of a current i circulating through a diode 30, a resistance 31 and the transistor 29.

The diode 30, in the present case an electroluminescent diode (LED), has the characteristic of having a stable forward drop voltage Ud of about 2 Volts even when the current i which traverses it varies, the variations in current being due to the decrease of the voltage of the battery 1 during its utilization. The value of the resistance 31 provides a choice for the current i of the measurement, this choice being determined as a function of the inner resistance of the battery 1. A detector 32 constituted by a Schmidt flip-flop, provides for the clear detection of the minimum threshold furnished by the voltage shift of Vcc−Ud. Vcc is at the moment of the measurement the voltage of the battery under load which depends from the internal resistance $r_i$ of the battery according to the relation $Vcc=Uo-r_i \cdot i$, where Uo is the unloaded voltage of the battery.

Once this threshold is reached, the output 32_a_ of the detector 32 is at the logic state 1 and the output $Q_{27}$ of the flip-flop 27 at the logic state 1. The measurement is then stopped by the AND gate 28, its input 28$a_2$ being connected to the output Q of the flip-flop 27 which is at the logic state 0. An order is sent by the output $Q_{27}$ of the flip-flop 27 to the display control circuit 9, so as to reduce the power consumption of this display, for instance by producing an intermittent display (twinkling). Consequently, the effect is two fold, i.e. reducing the power consumption at the moment when the battery comes near to exhaustion, and signaling this circumstance to the user through to the twinkling effect of the display.

The measurement is automatically re-armed when, during the next immersion preceeded by a pressure on the control switch 13, the reset input R of the flip-flop 27 is connected to the reset outputs $R_6$ and $R_7$ of the counters 6 and 7 (FIG. 2).

It is to be noted that, for reasons of safety, the counters 5, 6 and 7 start to count from one minute and not from zero minute, according to the rules in force in submarine diving.

Figure 4:
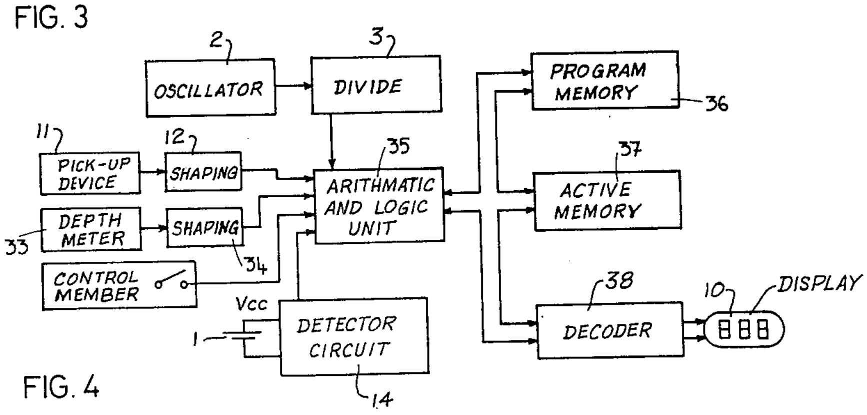
FIG. 4 shows a block-diagram of a modification of a minutes counter for diving.

The modification of FIG. 4 is distinguished from the first embodiment by the fact that it comprises a bathymeter or depth meter 33, the information of which is sent to a shaping circuit 34 connected to the control logic circuit designated by 35. Control logic 35 is an arithmetic and logic unit which needs a program memory or dead or hard wired memory, indicated at 36, and a living or active memory indicated at 37. Decoder 38 is provided to drive display 10.

The apparatus according to this modification can calculate the depths and durations of decompression levels necessary for allowing the diver to come upwardly without danger, taking into account the duration and the depth of the dive, or even the duration of the dive at each depth.

What I claim is:

1. An electronic time-counter for diving, the time counter being carried by a diver during the dive and comprising:

- a source of electric energy;
- time base means coupled to the source and providing a time base signal;
- divider means providing a pulsed time unit signal in response to the time base signal;

counter means for counting the pulses of the time unit signal, the counter means being switchable between an enabled condition in which the counter means count the pulses, and a disabled condition in which the counter means perform no counting of the pulses, the counter means including at least a portion which is resettable to zero;

display means for visually displaying the count of the counter means;

pick-up means for automatically placing and maintaining the counter means in the enabled condition under the action of water at the immergence of the electronic time-counter and for automatically placing and maintaining the counter means in the disabled condition under the absence of water at the emergence of the electronic time-counter; and control means which are manually operable for resetting to zero the portion of the counter means to provide for the measurement of intermediate time periods between the immergence and emergence of the electronic time-counter of a dive.

2. The time-counter as claimed in claim 1 in which the counter means include first memory means coupled to the control means for recording the number of pulses counted between the automatic placing of the counter means in the enabled condition at the immersion of the time-counter, and the first operation of the control element after the immersion of the time-counter.

3. The time-counter as claimed in claim 2 in which the counter means include second memory means coupled to the control means for recording the total number of pulses occurring during the duration of a dive from the automatic placing of the counter means in the enabled condition at the immersion of the time-counter to the automatic placing of the counter means in the disabled condition at the emergence of the time-counter.

4. The time-counter as claimed in claim 1 further including a depth meter and a control logic means; the divider means, the pick-up means, the depth meter and the counter means being coupled to the control logic means; the control logic means including an arithmetic and logic unit, a program memory and an active memory, whereby the control logic means automatically calculates the depth and duration of decompression levels of a dive as a function of the depth and duration of the dive.

5. The time-counter as claimed in claim 1 in which the source of electric energy is connected to power the apparatus and the source has an internal resistance which changes as the source is discharged, the time-counter further including:

an electrical load;

connection means for periodically discharging the source through the load;

measuring means connected to the source for producing a measurement signal indicating the internal resistance of the source while the source is discharged through the load;

detector means connected to the measurement signal for producing a set signal when the internal resistance of the source has changed beyond a threshold level; and flip-flop means which are bistable and which are coupled to receive the set signal, one state of the flip-flop means corresponding to the internal resistance of the source being less than the threshold level, the flip-flop means maintaining the apparatus in a normal operating condition, and the other state of the flip-flop means corresponding to the internal resistance of the source being greater than the threshold level, the flip-flop means placing the apparatus in a reduced power condition in which the apparatus uses less than a normal amount of electrical energy, the set signal operating the flip-flop means between the one and the other state.

6. The apparatus as claimed in claim 5 further including a display which provides visual indications of the apparatus and which is bistable, in one state the display normally operating and using a regular amount of electrical energy and in the other economical state the display using less electrical energy than in the one state and providing a visual indication of the display being in the other economical state.

7. The apparatus as claimed in claim 5 in which the connection means are coupled to receive the set signal whereby the connection of the source to the load is interrupted with the flip-flop means then remaining in the other state.

8. The apparatus as claimed in claim 5 in which the measuring means include a diode having a stable forward voltage drop with variations in current therethrough, the diode being connected in series between the source and load.

* * * * *